(No Model.)
J. LEFLET.
TRAP.
No. 516,937. Patented Mar. 20, 1894.
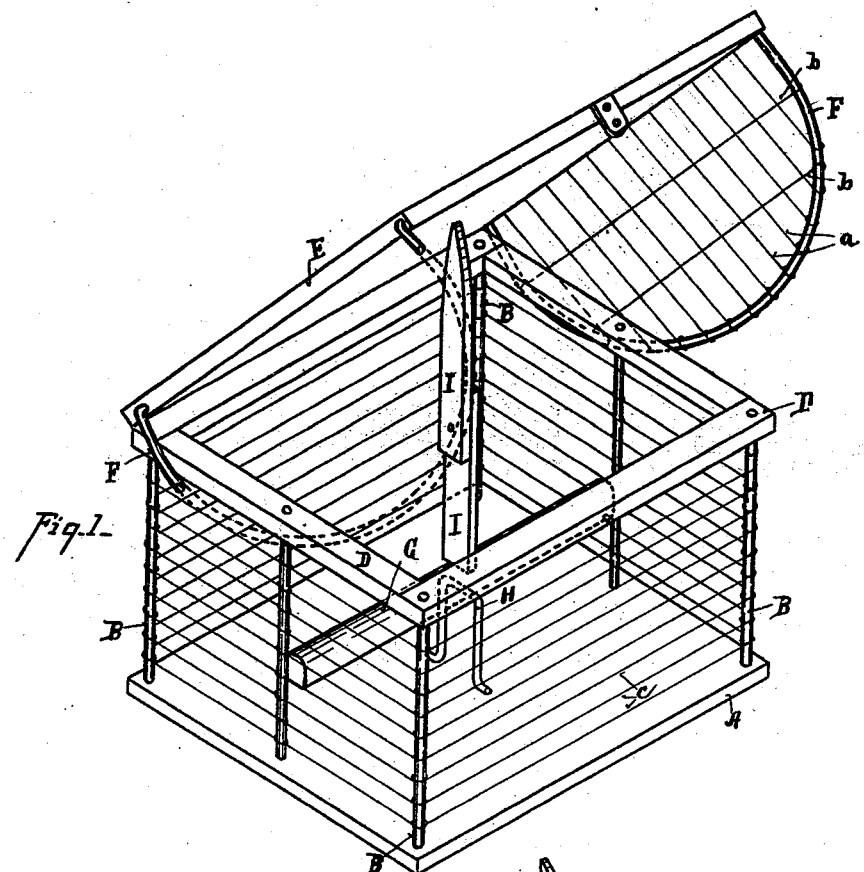
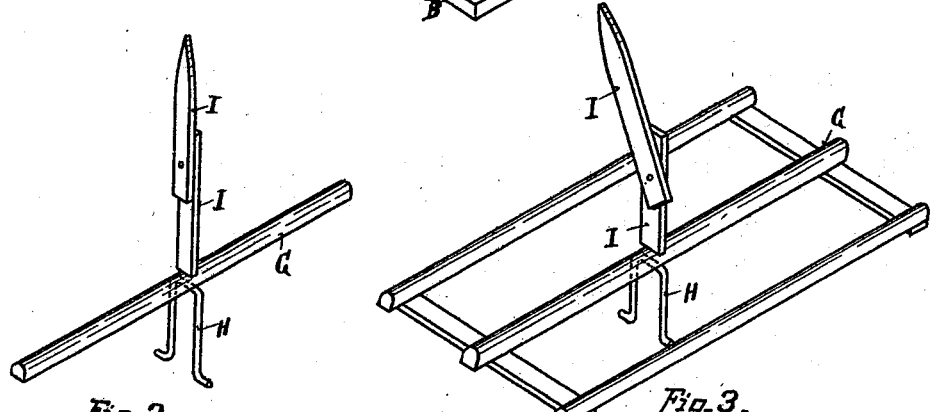

UNITED STATES PATENT OFFICE.

JOHN LEFLET, OF NEWPORT, KENTUCKY.

TRAP.

SPECIFICATION forming part of Letters Patent No. 516,937, dated March 20, 1894.

Application filed September 16, 1893. Serial No. 485,650. (No model.)

*To all whom it may concern:*

Be it known that I, JOHN LEFLET, a citizen of the United States, residing at Newport, in the county of Campbell and State of Kentucky, have invented certain new and useful Improvements in Traps, of which the following is a specification.

My invention relates to an individual bird trap, the various features of which are fully set forth in the description of the accompanying drawings making a part of this specification, in which—

Figure 1 is a perspective view of a trap set in position. Fig. 2 is a detail view of the trigger mechanism. Fig. 3 is a modification of Fig. 2.

A represents the base of the trap. B posts inserted in the base, and upon which are strung the wires c which form the cage.

D represents the top rails on which the lid E normally rests.

F, F, represent bows inserted in the lid E.

a, b, represent wire cords strung across the bows to form a netting; the bows, wire and cords form a wing, and when the lid is raised it prevents the bird from entering the trap from the end.

G represents a tripping pole.

H represents a two limbed bracket, with the ends turned outward to form feet.

I represents a link toggle composed of two small pieces of wood pivoted together, the lower end being square and adapted to rest on the upper side of the tripping pole, and the top being sharpened or pointed at its upper end to engage with the wood cover of the trap. If desired a small notch may be formed in the wood cover for the pointed end of the link; but this is not essential if the upper end of the link is sharpened, or provided with a sharpened attachment.

In Fig. 3 I have shown three tripping poles attached together in the form of a frame; the object of these tripping poles is for the bird to light on the same when it enters the trap, which produces a downward motion of the tripping pole and causes the bracket H to turn, or the toggle link I to turn slightly; a very slight movement on the tripping pole will cause either movement, when the lid drops and closes the trap.

The tripping pole G is intended to be delicately poised, and in practice it is balanced on the two limbed bracket H, and the link I extends upward in the plane of this bracket, so that any movement of the tripping pole will slightly rock the bracket H, when the center of gravity of the parts will be destroyed and the trap immediately operates.

In order to induce the bird to enter the trap any desired bait may be placed inside. The wings prevent the birds from entering the trap at the ends and they must enter at the front, when they will light on the tripping pole. The object of having three tripping poles on the frame, as shown in Fig. 3, is in case the trap is wide not to have space to allow the bird to alight between the tripping poles and the sides of the trap. Any number of tripping poles may be employed.

Having described my invention, what I claim is—

1. The combination with a wire-screen cage-body, and a lid, of a bracket H arranged at the bottom of the cage-body, a tripping pole G balanced between its ends on the bracket, and a toggle-link bearing against the tripping pole in line with the bracket and adapted to hold the lid open, substantially as described.

2. The combination with a cage-body, of a lid provided with pendent end wings, a bracket H arranged at the bottom of the cage-body, a tripping pole G balanced between its ends on the bracket, and a toggle-link composed of two pivotally connected sections, one bearing against the tripping pole in line with the bracket, and the other adapted to hold the lid open, substantially as described.

In testimony whereof I have hereunto set my hand.

JOHN LEFLET.

Witnesses:
WILL R. WOOD,
T. SIMMONS.